United States Patent
Minami et al.

(10) Patent No.: US 6,262,187 B1
(45) Date of Patent: Jul. 17, 2001

(54) COLOR COATING COMPOSITIONS

(75) Inventors: Tsutomu Minami; Hiroyuki Nakazumi, both of Osaka; Yoshiaki Sakashita, Hyogo; Kazuhisa Ishii, Hyogo; Hidefumi Kanazawa, Hyogo; Mikio Ueda, Hyogo; Masayuki Funato, Hyogo, all of (JP)

(73) Assignee: Nagase Chemtex Corporation, Osaka (JP)

( * ) Notice: Subject to any disclaimer, the term of this patent is extended or adjusted under 35 U.S.C. 154(b) by 0 days.

(21) Appl. No.: 09/446,265

(22) PCT Filed: Aug. 27, 1997

(86) PCT No.: PCT/JP97/02994

§ 371 Date: Jan. 13, 2000

§ 102(e) Date: Jan. 13, 2000

(87) PCT Pub. No.: WO98/59010

PCT Pub. Date: Dec. 30, 1998

(30) Foreign Application Priority Data

Jun. 20, 1997 (JP) .................................................. 9-164225

(51) Int. Cl.$^7$ .................................................. C08G 18/32
(52) U.S. Cl. .................... 525/464; 106/287.16; 106/481; 427/387; 428/447; 528/29; 528/43
(58) Field of Search ............................ 428/447; 427/387; 528/43, 29; 525/464; 524/588; 106/481, 287.16

(56) References Cited

FOREIGN PATENT DOCUMENTS

| 01320742 | * | 12/1989 | (JP) . |
| 5-178623 | | 7/1993 | (JP) . |
| 60166352 | * | 8/1995 | (JP) . |
| 09239311 | * | 9/1997 | (JP) . |

* cited by examiner

Primary Examiner—Robert Dawson
Assistant Examiner—Marc S. Zimmer
(74) Attorney, Agent, or Firm—Armstrong, Westerman, Hattori, McLeland & Naughton, LLP

(57) ABSTRACT

Objects of the present invention are to provide colored coating compositions which can form easily a colored glass gel coating film being excellent in water resistance, boiling water resistance, alkali resistance, weather resistance, etc. at low temperatures on the outer surface of glass products, metal products, etc. and to provide colored coating compositions with which colored bottles having no haze can be obtained even if the bottles are coated in a high-humidity environment. The colored coating compositions according to the present invention comprise a sol-gel liquid obtained by polycondensation of phenyltrialkoxysilane or an oligomer thereof, acryl polyol, polyester polyol, polyether polyol and/or lower alkyl polyol (or the acryl polyol, the polyester polyol and/or the polyether polyol and a polyisocyanate resin), and an organic coloring agent.

5 Claims, No Drawings

COLOR COATING COMPOSITIONS

TECHNICAL FIELD

The present invention relates to colored coating compositions which can easily form a colored glass gel coating film which is practical and excellent in water resistance, boiling water resistance, alkali resistance, weather resistance, etc. and, at low temperatures on the outer surface of glass products such as glass bottles, ceramic products, metal products, etc. In particular, the present invention relates to colored coating compositions to color the outer surface of the glass bottles which can be recycled in the form of transparent cullet.

BACKGROUND ART

Glass products has hitherto been colored by incorporating metal ions such as iron ion, chromium ion and cobalt ion as a coloring agent in raw materials of glass. However, collected colored cullet does not become colorless by heating and fusing due to the above-mentioned metal ions. A demand for recycling glass bottles has been increasing in recent years. However, the other colored bottles than brown bottles are not suitable for recycling because their colors remain even after fusion. Such bottles are disposed mainly as waste products.

In order to make the heated and fused products colorless, Japanese Laid-open Patent Publication No. 320742/1989 proposed a method of forming a glass gel coating film at heating temperatures of 500° C. or lower by a sol-gel method through hydrolysis and polycondensation of metal alkoxides using coating compositions containing the metal alkoxides, water, acids, alcohols, and organic pigments and dyes as coloring agents. However, the glass gel coating film obtained at the heating temperatures of 500° C. or lower by the sol-gel method has a lot of pores and tends to become porous. As a result, no dense film is obtained, and the obtained film causes the problems that the film is not good in water resistance and the dyes are eluted owing to invasions of water, chemicals, etc. into the pores of the film surface.

In order to solve these problems, Japanese Laid-open Patent Publication No. 178623/1993 proposed a method of forming a glass gel coating film wherein heating is carried out at the temperature of 500° C. lower by the sol-gel method using coating compositions containing pigment particles having particle diameters being larger than those of pores of the glass gel coating film.

However, the method has the following defects. Adjustment of the particle diameters to obtain the pigment particles having the particle diameters being larger than that of the pores of the glass gel coating film is troublesome. Further, the compositions cannot provide the products having desired sufficient water resistance.

As mentioned above, the glass gel coating films having photo absorptivity have hitherto been formed by the sol-gel method. In this process, however, heating temperatures of the films were controlled at a low temperature in terms of heat resistance of coloring agents. Consequently, the obtained glass gel coating films were porous and caused the problems with water resistance, boiling water resistance, alkali resistance, weather resistance, etc. as mentioned above.

An object of the present invention is to provide colored coating compositions which can easily form a colored glass gel coating film which is excellent in water resistance, boiling water resistance, alkali resistance, weather resistance, etc. at low temperatures on the outer surface of glass products, metal products, etc. in view of the above-mentioned problems.

There also hitherto existed the problem that when coloring coating operation of bottles is carried out under high-humidity environment in rainy weather, obtained colored bottles have haze.

Another object of the present invention is to provide colored coating compositions with which colored bottles having no haze can be obtained even if coating is carried out under the high-humidity environment.

DISCLOSURE OF THE INVENTION

In order to solve the above-mentioned problems, a first colored coating composition according to the present invention comprises a sol-gel liquid obtained by polycondensation of phenyltrialkoxysitane or oligomer thereof, one polyol selected from the group consisting of acryl polyol, polyester polyol, polyether polyol and lower alkyl polyol or a combination thereof, and an organic coloring agent.

A second colored coating composition according to the present invention comprises a liquid obtained by polycondensation of phenyltrialkoxysilane or oligomer thereof, one polymer selected from the group consisting of acryl polyol, polyester polyol and polyether polyol or a combination thereof, a polyisocyanate resin and the organic coloring agent.

In the coating compositions of the present invention, polycondensates obtained by the polycondensation of the phenyltrialkoxysilane or the oligomer thereof act as base substances for forming sol-gel glass.

In the present specification, the polycondensation of the phenyltrialkoxysilane or the oligomer thereof includes not only single polycondensation of the phenyltrialkoxysilane or the oligomer thereof but also copolycondensation of the phenyltrialkoxysilane or the oligomer thereof with small amounts of other metal alkoxides such as tetraethoxysilane and tetraisopropoxytitanium.

The phenyltrialkoxysilane is represented by the general formula: $Si(C_6H_5).(OR)_3$
wherein R means a lower alkyl group, preferably an alkyl group having 1 to 5 carbon atoms.

Phenyltrimethoxysilane or phenyltriethoxysilane is particularly preferable as the phenyltrialkoxysilane.

Examples of the acryl polyol are a homopolymer of hydroxyalkyl (meth)acrylate, a copolym or of hydroxyalkyl (meth)acrylate with alkyl (meth)acrylate, etc., as the polymer selected from the group consisting of the acryl polyol, the polyester polyol, the polyether polyol and the lower alkyl polyol or a combination thereof (hereinafter referred to as "acryl polyol or the like") to be used for the coating compositions of the present invention. More specifically, there can be used a homopolymer of hydroxyethyl (meth) acrylate, a copolymer of hydroxyethyl (meth)acrylate with isobutyl (meth)acrylate, etc. Weight-average molecular weight of the acryl polyol is, for example, 1000 to 100000, preferably 5000 to 50000, more preferably 10000 to 30000. Number-average molecular weight of the acryl polyol is, for example, 500 to 50000, preferably 2500 to 25000, more preferably 5000 to 15000. Typical examples of the acryl polyol are a base of a paint composition "Retan PG80" manufactured by Kansai Paint Co., Ltd. (The base contains the acryl polyol at the rate of 58.7% by weight.) and a resin composition "Acrydic A-801P"(hydroxyl value: 50)manufactured by Dai Nippon Ink & Chemicals Inc.

Examples of the polyester polyol are a resin composition "Baiknock D6-520"(hydroxyl value: 210) manufactured by Dai Nippon Ink & Chemicals Inc., etc. Weight-average molecular weight of the polyester polyol is, for example, 250 to 10000, preferably 300 to 5000, more preferably 500 to 1500.

Typical examples of the polyether polyol are an adduct of glycerin with propylene oxide such as "Sannix GP-600"

manufactured by Sanyo Chemical Co., Ltd. (hydroxyl value: 280) and an adduct of sorbitol with propylene oxide (hydroxyl value: 490). Other examples of the polyether polyol are an adduct of glycerin with ethylene oxide, polyethylene glycol, polypropylene glycol, etc.

Examples of the lower alkylpolyol are dihydric alcohols such as 1,4-butanediol, ethylene glycol, diethylene glycol, tetraethylene glycol and 2-methyl-2,4-pentanediol and trihydric alcohols such as glycerin, trimethylolpropane and 1,2,6-hexanetriol.

An amount of ethylene glycol as lower alkylpolyol to be added is preferably 1 to 10% by weight, more preferably 3 to 5% by weight to the whole composition. A carbon number of the lower alkylpolyol is preferably 2 to 10.

1,3,5-tris(isocyanatehexamethylene)isocyanurate, which is a cyclic trimer of hexamethylenediisocyanate, is preferable as the polyisocyanate resin to be used for the second colored coating composition according to the present invention. A typical example of the polyisocyanate resin is a curing agent of a paint composition "Retan PG80" manufactured by Kansai Paint Co., Ltd. The agent contains the polyisocyanate resin.

In the second coating composition according to the present invention, the acryl polyol, the polyester polyol and/or the polyether polyol can be esterified with the polyisocyanate resin at least partially each other to form polyurethane. Such polyurethane is preferably alcohol-soluble considering water resistance. When organic polymers are hybridized with silica, obtained films generally tend to become hard and fragile. Accordingly, it is preferable to select the acryl polyol, the polyester polyol and/or the polyether polyol and the polyisocyanate resin so as to form polyurethane being rich in rubber elasticity.

The organic coloring agent to be used for the coating composition of the present invention is selected from the group consisting of azo, anthraquinone, naphthoquinone, isoindolinone, perylene, indigo, fluorenone, phenazine, phenothiazine, polymethine, polyene, diphenylmethane, triphenylmethane, quinacridone, acridine, phthalocyanine and quinophthalone organic dyes or organic pigments, chinaink, carbon black, and a mixture thereof.

More specific examples of the organic coloring agent are organic dyes such as DIANIX BLUE BG-FSNEW (manufactured by Mitsubishi Chemical Hoechst, Ltd.), DIANIX YELLOW G-FS (manufactured by Mitsubishi Chemical Hoechst, Ltd.) and DIANIX RED KBN-SE (manufactured by Mitsubishi Chemical Hoechst, Ltd.), organic pigments such as a phthalocyanine pigment (C.I. Pigment Blue 16, manufactured by Sanyo Pigment Co., Ltd.) and a copper phthalocyanine pigment (C.I. Pigment Green 7, manufactured by Sanyo Pigment Co., Ltd.), azo yellow and red pigments such as benzidine yellow and carmine FB, and condensed pigments such as perylene, perynone, dioxazine, thioindigo, isoindolinone, quinophthalone and quinacridone.

The pigment can contain metals like copper phthalocyanine. Such a pigment can be used in an allowable range of an amount because its amount to be added is very small and a coating film is very thin.

When the pigment is insoluble or hardly soluble in a solvent, the pigment can be used in the form of dispersion of fine particles in a polar solvent. When transparency is required, a diameter of the pigment particle is preferably 200 nm or less.

With respect to a formulation ratio of each component of the compositions according to the present invention, when the weight of phonyltrialkoxysilane and/or oligomer thereof is referred to as "A", the weight of acryl polyol or the like in the first comnposition (total weight of the acryl polyol, the polyester polyol and/or the polyether polyol and the polyisocyanate resin in the second composition) is referred to as "B", the weight of organic coloring agent is referred to as "C" and the weight of coating composition is referred to as "D", the following relations preferably hold:

B/A=0.1 to 2,

C/A=0.01 to 1, and (A+B+C)/D=0.05 to 0.5, and the following relations more preferably hold:

B/A=0.3 to 1.5,

C/A=0.1 to 0.3, and (A+B+C)/D=0.1 to 0.3.

When B/A is less than 0.1, an obtained colored coating film is remarkably poor in alkali resistance, boiling water resistance and surface activity. When B/A is more than 2, hardness of the obtained colored coating film is low. When C/A is less than 0.01, stability of the colored coating film decreases depending on the organic coloring agent. When C/A is more than 1, strength of the obtained colored coating film decreases. Furthermore, when (A+B+C)/D is less than 0.05, it is difficult to obtain practical thicknesses of the coating film. When (A+B+C)/D is more than 0.5, storage stability of the composition sometimes decreases.

An organic solvent is usually used in order to produce the sol-gel liquid of the coating composition of the present invention. There can suitably be used a lower alcohol having 1 to 5 carbon atoms such as methanol, ethanol, n-propanol, isopropanol, n-butanol, isobutanol, t-butanol or n-pentanol as the organic solvent. It is also possible to combine a small amount of an organic solvent other than the lower alcohol, for example, higher alcohols, methyl ethyl ketone, methyl isobutyl ketone, toluene, ethyl acetate, etc. with the above-mentioned organic solvent.

A catalyst is usually used in order to produce the sol-gel liquid of the coating composition of the present invention. Examples of the catalyst which can be recommended are acidic catalysts widely used such as inorganic acids such as hydrochloric acid and nitric acid, organic acids such as acetic acid, oxalic acid, succinic acid, maleic acid and itaconic acid, Lewis acids such as boron trifluoride, etc.

It is also possible to add an ultraviolet absorbing agent, an infrared absorbing agent and other additives to the coating composition of the present invention, if necessary. When they are soluble in a prepared sol-gel liquid, they are dissolved in the liquid as they are, or they are added to the composition in the form of solution of polar solvent.

It is also possible to recommend that an organic polymer is added to the coating composition of the present invention in order to adjust thickness of the coating film and improve film formation and adhesion to glass. A suitable organic polymer to be added is a polymer which is soluble in the above-mentioned solvents. Examples of the organic polymer are ethyl cellulose, alcohol-soluble polyamide, polyvinyl pyrroridone, a precondensate of an epoxy resin and a precondensate of a methylol melamine resin. It is also effective to add a silanc coupling agent to the composition in order to increase affinity of the organic additive for the condensation polymer of the metal alkoxide.

In order to prepare the coating composition of the present invention, the phenyltrialkoxysitane or the oligomer thereof is first added to an organic solvent containing water and the catalyst to carry out the reaction and give the sol-gel liquid. The sol-gel liquid is mixed with stirring with a compound comprising the acryl polyol or the like in the case of the first composition (the acryl polyol, the polyester polyol and/or the polyether polyol and the polyisocyanate resin in the case of the second composition), the organic coloring agent and the organic solvent. The coating composition can also be prepared by mixing the sol-gel liquid with stirring with a compound comprising the phenyltrialkoxysilane or the oligomer thereof, water, the organic solvent, the optional catalyst such as the inorganic acid, the acryl polyol or the like in the case of the first composition (the acryl polyol, the polyester polyol and/or the polyether polyol and the polyisocyanate resin in the case of the second composition), the organic coloring agent and the organic solvent. There can appropriately be used a twin roll, a three roll, a Banbury mixer, an SG mill, an atlighter, etc. for stirring.

It is also possible to prepare in advance an organic solvent containing the phenyltrialkoxysilane or the oligomer thereof and an organic solvent containing water and the catalyst for hydrolysis separately and mix both solvents and stir the mixture before use to carry out the polycondensation.

Thickness of the glass gel coating film is preferably 0.2 to 3 μm, more preferably 0.3 to 2 μm. When the thickness is less than 0.2 μm, a coloring value is insufficient. When the thickness is 3 μm or more, the film sometimes crazes.

A method of application of the coating composition of the present invention is not particularly limited. For example, there can be used some methods such as brushing, spray coating, dipping, flow-coating and spin coating. The composition is applied on the surface of glass products, the solvent is evaporated, and then low-temperature heating is carried out at an suitable temperature not to decompose the organic additives to form a glass gel coating film which is excellent in boiling water resistance and alkali water resistance on the surface. When the heating temperature is 100° C. or higher, considerable boiling Water resistance and alkali water resistance are obtain. It is preferable to raise the temperature to 200° C. or higher in the range not to decompose the organic additives in order to elevate the above-mentioned resistances up to practical levels. The heating temperature is usually, for example, 150° to 300° C. Heating time can be a few minutes or longer, and the time is preferably 20 to 30 minutes or longer in order to obtain the physical properties at the practical levels.

Transparent glass can easily be regenerated by heating and fusing the colored and coated glass products obtained by the above-mentioned after use. Since the composition of the present invention is applied on the surface of the glass products to color the products after forming the products, it is unnecessary to prepare glass colored in different colors, and it is very easy to produce the colored glass products.

The coating compositions for forming the glass get film according to the present invention exhibits the following actions.

When suitable amounts of the catalyst and water are added to a mixed liquid comprising the phenyltrialkoxysilane or the oligomer thereof and the solvent, the phenyltrialkoxysilane or the oligomer is hydrolyzed in the solution, and sol is formed by dehydration and condensation. Then, in a process for coating glass bottles with the sol and drying the sol, the applied sol changes into gel. At this time, siloxane bonds are formed among sol particles, and skeletal structure of the gel is formed. Furthermore, the obtained glass gel coating film is calcined to increase a number of the siloxane bond among the particles and to give a strong glass gel film.

In the case of silica, a high temperature of 1000° C. or higher is usually required in order to eliminate pores of the glass gel and to obtain a complete glass film. However, since the coating composition of the present invention contains the organic coloring agent, the coloring agent would be decolorized and pyrolytically decomposed when the composition is calcined at 300° C. or higher. Then, in the present invention, in order to improve the alkali resistance and the boiling water resistance, a composition further comprising the acryl polyol or the like, which is soluble in an alcoholic solution, etc. in the case of the first composition (the acryl polyol, the polyester polyol and/or the polyether polyol and the polyisocyanate resin in the case of the second composition) is calcined by the sol-gel method at a temperature which is not higher than the decomposition temperatures of the acryl polyol or the like (the acryl polyol, the polyester polyol and/or the polyether polyol and the polyisocyanate resin in the case of the second composition) and the coloring agent to form the colored glass gel coating film.

In order to obtain a practical surface film of the glass bottles, physical strength of film surface such as hardness or flaw resistance strength is required, and water resistance, the boiling water resistance, the alkali resistance, weather resistance, etc. are required as chemical properties. These are described as follows.

In general, in order to form a glass gel coating film containing a pigment to be used for a coloring agent, the pigment is first mixed with a solution of raw materials to form sol, and then the sol is applied and dried. At this time, the pigment incorporated into sol particles is very little, and most of the pigment exists in state where the pigment is put between the sol particles when gel is formed. Accordingly, most of the pigment is then incorporated into pores of the formed gel. Since the surface of the pores of the gel has hydroxyl groups formed by hydrolysis of a metal alkoxide, the surface exhibits strong affinity for water, and water is apt to permiate into the pores. Water permiating into the pores clutes the pigment existing in the pores. As a result, the glass gel film cannot maintain desired spectral transmittance characteristics.

As a result of various experiments, the present inventors found that the glass gel coating film which is practical and excellent in the water resistance, the boiling water resistance, the alkali resistance, the weather resistance, etc. is formed by using the coating composition comprising the acryl polyol or the like in the case of the first coating composition (the acryl polyol, the polyester polyol and/or the polyether polyol and the polyisocyanate resin in the case of the second coating composition), and the organic coloring agent which are added to the sol-gel liquid obtained by the polycondensation of the phenyltrialkoxysilane or the oligomer thereof.

It is also possible to apply the coating composition to conventional transparent glass bottles in order to color the bottles by suitable selection of colors and prevent properties of the contents from changing owing to ultraviolet absorption.

Furthermore, the obtained glass products having the colored glass gel coating film are also advantageous in terms of recycling of materials. Namely, since all ingredients of the coating composition of the present invention are organic compounds, the coating film comprising the coating composition of the present invention burns when the glass products are heated and fused in a process for regeneration treatment. Accordingly, molten glass does not contain impure inorganic components unlike conventional glass. The molten glass is colorless or transparent, and its physical properties do not deteriorate. Accordingly, it is possible to avoid trouble to select and recycle only glass bottles having a same color, unlike a conventional method.

In addition, according to the coating composition of the present invention, unlike the method described in Japanese Laid-open Patent Publication No. 178623/1993 wherein adjustment of particle diameters to obtain pigment particles having the particle diameters being larger than pores of a glass film is troublesome, it is unnecessary to carry out such a troublesome operation.

BEST MODE FOR CARRYING OUT THE INVENTION

Examples of coating compositions according to the present invention are shown below, and they are intended for better understanding the present invention but are not to limit the scope of the present invention.

EXAMPLE 1

Preparation of Glass Sol

A phenyltrimethoxysilane monomer (39.7 g), isopropanol (hereinafter abbreviated as "IPA", 52.1 g), 60% nitric acid (0.2 g) and water (8.1 g) were mixed, and the mixture was stirred at room temperature for about eight hours to give a sol-gel liquid containing a sole polycondensate of the phenyltrimethoxysilane monomer.

Preparation of Coating Composition

The above-mentioned sol-gel liquid (100.0 g), IPA dispersion (233.3 g) containing ultrafine particles of a copper phthalocyanine pigment (C.I. Pigment Green 7) as an organic pigment in an amount of 2.5% and IPA (166.7 g) were mixed, 26.3 g of a base of a paint composition "Retan PG 80" manufactured by Kansai Paint Co., Ltd. (containing acryl polyol in an amount of 58.7% by weight) was further added to the mixture, and the whole was mixed to give a coating composition.

Coating of Glass Bottle

A soda lime glass bottle mold newly was flow coated in the liquid of the coating composition while turning the bottle at about 100 rpm, and the bottle was further turned at 400 rpm to shake off the liquid. Meanwhile IPA evaporated to form a transparent wet gel film on the surface of the bottle. The film was predried at 60° C. for about 10 minutes and then placed in a dryer at 250° C. for 10 minutes to carry out main drying. Even if the temperature of the bottle was lowered to room temperature, a transparent green colored bottle having no crazing was obtained.

EXAMPLE 2

A coating liquid was prepared in the same manner as in Example 1 except that the amount of the base of the paint composition "Retan PG80" used in Example 1 was changed to 55.5 g. A glass bottle was coated in the same manner as in Example 1 using the liquid.

EXAMPLE 3

Preparation of Sol-gel Liquid

A sol-gel liquid was obtained in the same manner as in Example 1.

Preparation of Coating Composition

A coating composition was obtained in the same manner as in Example 1 except that 25 g of a resin composition "Barknock D6-520" manufactured by Dai Nippon Ink & Chemicals Inc. was used as polyester polyol in place of acryl polyol.

Coating of Glass Bottle

A soda lime glass bottle molded newly was immersed in the liquid of the coating conposition and then pulled up. The bottle was turned at about 500 rpm to shake off the liquid. Meanwhile IPA evaporated to form a wet gel film on the surface of the bottle. The film was predried at 50° C. for about 30 minutes and then placed in a dryer at 200° C. for 20 minutes to carry out main drying. Even if the temperature of the bottle was lowered to room temperature, a green colored bottle having no crazing at all was obtained.

EXAMPLES 4 to 8

Coating liquids were prepared in the same manner as in Example 3 except that required amounts of the substances shown in Table 1 were used in place of polyester polyol in the process for preparing the coating liquid in Example 3. Glass bottles were coated in the same mailner as in Example 3 using the liquids.

COMPARATIVE EXAMPLES 1 to 3

Coating liquids were prepared in the same manner as in Example 1 except that acryl polyol was not used among the components used in Example 1 and the amounts of respective components were changed to the values shown in Table 4. Glass bottles were coated in the same manner as in Example 1 using the liquids.

EXAMPLE 9

Preparation of Sol-gel Liquid

A sol-gel liquid was obtained in the same manner as in Example 1.

Preparation of Coating Composition

The above-mentioned sol-gel liquid (100.0 g), IPA dispersion (163 g) containing ultrafine particles of a copper phthalocyanine pigment (C.I. Pigment Blue 15) as an organic pigment in an amount of 2.5% and IPA (237 g) were mixed, 1,4-butanediol (15 g) was added to the mixture, and the whole was mixed to give a coating composition.

Coating of Glass Bottle

A soda lime glass bottle molded newly was immersed in the liquid of the coating composition in a high-humidity environment in rainy weather (relative humidity: 88% temperature: 24° C.) and then pulled up. The bottle was turned at about 500 rpm to shake off the liquid. Meanwhile IPA evaporated to form a wet gel film on the surface of the bottle. The film was predried at 50° C. for about 30 minutes and then placed in a dryer at 200° C. for 20 minutes to carry out main drying. A transparent blue colored bottle having no haze was obtained.

EXAMPLES 10 to 15

Coating liquids were prepared in the same manner as in Example 9 except that required amounts of the lower alkali polyols shown in Table 2 were used in place of 1,4-butanediol in the process for preparing the coating liquid in Example 9. Glass bottles were coated in the same manner as in Example 9 using the liquids.

COMPARATIVE EXAMPLE 4

A coating liquid was prepared in the same manner as in Example 9 except that 1,4-butanediol was not used among the components used in Example 9. A glass bottle was coated in the same manner as in Example 9 using the liquid.

COMPARATIVE EXAMPLES 5 to 9

Coating liquids were prepared in the same manner as in Example 9 except that required amounts of the monovalent alcohols shown in Table 5 were used in place of 1,4-butanediol in the process for preparing the coating liquid in Example 9. Glass bottles were coated in the same manner as in Example 9 using the liquids.

EXAMPLE 16

In the process for preparing the coating composition in Example 1, glass sol (100.0 g) prepared in the prior process, IPA dispersion (233.3 g) containing ultrafine particles of a copper phthalocyanine pigment (C.I. Pigment Green 7) as an organic pigment in an amount of 2.5% and IPA (166.7 g) were mixed. With the mixture were further mixed 26.3 g of a base (containing acryl polyol in an amount of 58.7% by weight) of a paint composition "Retan PG80" manufactured by Kansai Paint Co., Ltd. and 2.6 g of a curing agent (comprising a polyisocyanate resin) of the paint composition "Retan PG80" to give a coating composition. A coating liquid was prepared in the same manner as in Example 1 except the above-mentioned step, and a glass bottle was coated in the same manner as in Example 1 using the liquid.

EXAMPLE 17

A coating liquid was prepared in the same manner as in Example 16 except that the amounts of the respective components used in Example 16 were changed to the values shown in Table 3, and a glass bottle was coated in the same manner as in Example 16 using the liquid.

COMPARATIVE EXAMPLES 10 and 11

Coating liquids were prepared in the same manners as in Examples 1 and 16 except that the phenyltrimethoxysilane monomer in Examples 1 and 16 was replaced with a tetramethoxysilane monomer and the respective components were used in amounts shown in Table 3. Glass bottles were coated in the same manners as in Examples 1 and 16 using the liquids.

Performance tests

The colored coating bottles obtained in Examples and Comparative Examples were tested for the following items.
1) Boiling water resistance test: The bottles were immersed in boiling water for 60 or 120 minutes.
2) Alkali water resistance test: The bottles were immersed in alkali water (2.5% aqueous sodium hydroxide solution) at 60° C. for 30 or 60 minutes after the boiling water resistance test.
3) Line simulation test: The bottles were tested with a line simulator (simulated travel impact machine manufactured by AGR Co., Ltd. (U.S.A.)) after the alkali water resistance test. The line simulation tests were carried out for two or five minutes.

Criteria of results of the boiling water resistance test and the alkali water resistance test are as follows.

○: An appearance (peeling of film, whitening, etc.) does not change at all after immersion.

Δ: An appearance hardly changes after immersion.

X: Peeling of the film or whitening is observed.

Criteria of the line simulation test are as follows.

◎: Flaws are not observed at all after the line simulation test.

○: Flaws are hardly observed after the line simulation test.

Δ: Flaws are slightly observed after the line simulation test.

X: Flaws are fairly observed after the line simulation test.

Test results are summarized in Tables 1 to 5.

TABLE 1

(g)

| | Example 1 | Example 2 | Example 3 | Example 4 | Example 5 | Example 6 | Example 7 | Example 8 |
|---|---|---|---|---|---|---|---|---|
| | Sol-gel liquid 100.0, Pigment dispersion 233.3, IPA 166.7 | | | | | | | |
| Retan PG80 | 26.3 | | | | | | | |
| Retan PG80 | | 55.5 | | | | | | |
| Acrydick | | | | 25.0 | | 12.5 | 12.5 | |
| Barknock | | | 25.0 | | | 12.5 | | 12.5 |
| Sannix | | | | | 25.0 | | 12.5 | 12.5 |
| Boiling water resistance | | | | | | | | |
| 60 min. | ○ | ○ | ○ | ○ | ○ | ○ | ○ | ○ |
| 120 min. | ○ | ○ | ○ | ○ | ○ | ○ | ○ | ○ |
| Alkali resistance | | | | | | | | |
| 30 min. | ○ | ○ | ○ | ○ | ○ | ○ | ○ | ○ |
| 60 min. | ○ | ○ | ○ | ○ | ○ | ○ | ○ | ○ |
| Line simulation | | | | | | | | |
| 2 min. | ○ | ○ | ◎ | ○ | ◎ | ○ | ○ | ◎ |
| 5 min. | Δ | Δ | ◎ | Δ | ◎ | Δ | Δ | ◎ |
| Appearance of coated bottle | ○ | ○ | ○ | ○ | ○ | ○ | ○ | ○ |

Retan PG80: A base of a paint composition "Retan PG80" actured by Kansai Paint Co., Ltd. (The base contains acryl polyol amount of 58.7% by weight.)

Acrydick: Acryl polyol (hydroxyl value: 50) "Acrydick A-801P" manufactured by Dai Nippon Ink & Chemicals Inc.

Barknock: Polyester polyol (hydroxyl value: 210) "Barknock D6-520" manufactured by Dai Nippon Ink & Chemicals Inc.

Sannix: Polyether polyol (hydroxyl value: 280) "Sannix GP-600" manufactured by Sanyo Chemical Co., Ltd.

TABLE 2

(g)

| | Example 9 | Example 10 | Example 11 | Example 12 | Example 13 | Example 14 | Example 15 |
|---|---|---|---|---|---|---|---|
| | Sol-gel liquid 100.0, Pigment dispersion 233.3, IPA 166.7 | | | | | | |
| BDO | 15.0 | | | | | | |
| DEG | | 15.0 | | | | | |
| TEG | | | 15.0 | | | | |
| HXG | | | | 15.0 | | | |
| GLC | | | | | 15.0 | | |

TABLE 2-continued (g)

|  | Example 9 | Example 10 | Example 11 | Example 12 | Example 13 | Example 14 | Example 15 |
|---|---|---|---|---|---|---|---|
| TMP |  |  |  |  |  | 15.0 |  |
| HTO |  |  |  |  |  |  | 15.0 |
| Appearance of coated bottle | Transparent blue | Transparent blue | Transparent blue | Transparent blue | Transparent blue | Transparent blue | Transparent blue |
| Boiling water resistance |  |  |  |  |  |  |  |
| 60 min. | ○ | ○ | ○ | ○ | ○ | ○ | ○ |
| 120 min. | ○ | ○ | ○ | ○ | ○ | ○ | ○ |
| Alkali resistance |  |  |  |  |  |  |  |
| 30 min. | ○ | ○ | ○ | ○ | ○ | ○ | ○ |
| 60 min. | ○ | ○ | ○ | ○ | ○ | ○ | ○ |
| Line simulation |  |  |  |  |  |  |  |
| 2 min. | Δ | Δ | ◎ | ○ | ○ | ○ | ◎ |

BDO: 1,4-Butanediol
DEG: Diethylene glycol
TEG: Tetraethylene glycol
HXG: Hexylene glycol (2-methyl-2,4-pentanediol)
GLC: Glycerin
TMP: Trimethylolpropane
HTO: 1,2,6-Hexanetriol

TABLE 3

| Example No. | Example 16 | Example 17 |
|---|---|---|
| Sol-gel liquid | 100.0 | 100.0 |
| Pigment dispersion | 233.3 | 233.3 |
| IPA | 166.7 | 166.7 |
| Liquid containing acryl polyol in an amount of 58.7% | 26.3 | 55.5 |
| Polyisocyanate resin | 2.6 | 5.6 |
| Appearance of coated bottle | Transparent green | Transparent green |
| Immersed in boiling water for 120 min. | ○ | ○ |
| Immersed in alkali water at 60° C. for 60 min. | ○ | ○ |

TABLE 4

(g)

| Comparative Example No. | Comparative Example 1 | Comparative Example 2 | Comparative Example 3 | Comparative Example 10 | Comparative Example 11 |
|---|---|---|---|---|---|
| Phenyltrimethoxysilane | 39.7 | 19.8 | 4.0 |  |  |
| Tetramethoxysilane | 0.0 | 11.5 | 20.8 | 23.1 | 23.1 |
| 60% Nitric acid | 0.2 | 0.2 | 0.2 | 0.2 | 0.2 |
| Water | 8.1 | 6.0 | 4.0 | 3.5 | 3.5 |
| IPA | 52.1 | 62.5 | 71.0 | 73.2 | 73.2 |
| IPA dispersion containing phthalocyanine in an amount of 2.5% | 233.3 | 233.3 | 233.3 | 233.3 | 233.3 |
| IPA | 166.7 | 166.7 | 166.7 | 166.7 | 166.7 |
| Liquid containing acryl polyol resin in an amount of 58.7% |  |  |  | 26.3 | 26.3 |
| Polyisocyanate resin |  |  |  |  | 2.6 |
| Appearance of coated bottle | Transparent green | Transparent green | Transparent green | Transparent green | Transparent green |
| Boiling water resistance |  |  |  |  |  |
| 60 min. | ○ | ○ | x | Δ | Δ |
| 120 min. | Δ | Δ | x | x | x |
| Alkali water resistance (60° C.) |  |  |  |  |  |
| 30 min. | ○ | Δ | x | Δ | Δ |
| 60 min. | Δ | x | x | x | x |

TABLE 5

|  | Comparative Example 4 | Comparative Example 5 | Comparative Example 6 | Comparative Example 7 | Comparative Example 8 | Comparative Example 9 |
|---|---|---|---|---|---|---|
| | (g) | | | | | |
| | Sol-gel liquid 100.0, Pigment dispersion 233.3, IPA 166.7 | | | | | |
| n-Butanol | | 15.0 | | | | |
| n-Hexanol | | | 15.0 | | | |
| n-Octanol | | | | 15.0 | | |
| n-Decanol | | | | | 15.0 | |
| Benzyl alcohol | | | | | | 15.0 |
| Coated in high humidity | Whole haze | Whole haze | Whole haze | Whole haze | Whole haze | Whole haze |
| Boiling water resistance | | | | | | |
| 60 min. | ○ | ○ | ○ | ○ | ○ | ○ |
| 120 min. | Δ | Δ | Δ | Δ | Δ | Δ |
| Alkali resistance | | | | | | |
| 30 min. | ○ | ○ | ○ | ○ | ○ | ○ |
| 60 min. | Δ | Δ | Δ | Δ | Δ | Δ |
| Line simulation | | | | | | |
| 2 min. | x | x | x | x | x | x |

The present invention exhibits the following effects.

Since the colored coating compositions according to the present invention comprise the sol-gel liquid, the acryl polyol or the like (the acryl polyol, the polyester polyol and/or the polyether polyol and the polyisocyanate resin in the case of the second composition) and the organic coloring agent, it is possible to form easily the colored glass gel coating film being excellent in water resistance, boiling water resistance, alkali resistance, weather resistance, etc. at low temperatures on the outer surface of glass products, metal products, etc.

In addition, colored bottles having no haze can be obtained by using the colored coating compositions comprising the sol-gel liquid, the lower alkyl polyol and the organic coloring agent, even if the bottles are coated in a high-humidity environment.

INDUSTRIAL APPLICABILITY

Colored coating compositions according to the present invention can form easily a colored glass gel coating film being excellent in water resistance, boiling water resistance, alkali resistance, weather resistance, etc. at low temperatures on the outer surface of glass products, metal products, etc., more particularly, are compositions to color the outer surface of glass bottles which can be recycled as transparent cullet.

What is claimed is:

1. A colored coating composition comprising a sol-gel liquid obtained by polycondensation of phenyltrialkoxysilane or an oligomer thereof, one polyol selected from the group consisting of acryl polyol, polyester polyol, polyether polyol and lower alkyl polyol or a combination thereof, and an organic coloring agent.

2. A colored coating composition comprising a sol-gel liquid obtained by polycondensation of phenyltrialkoxysilane or an oligomer thereof, one polyol selected from the group consisting of acryl polyol, polyester polyol and polyether polyol or a combination thereof, a polyisocyanate resin and an organic coloring agent.

3. A composition as claimed in claim 1, wherein, when weight of the phenyltrialkoxysilane and/or the oligomer thereof is referred to as "A", weight of one polyol selected from the group consisting of the acryl polyol, the polyester polyol and the polyether polyol or a combination thereof is referred to as "B", weight of the organic coloring agent is referred to as "C", and weight of the coating composition is referred to as "D", the following relations hold:

B/A=0.1 to 2,

C/A=0.01 to 1 and (A+B+C)/D=0.05 to 0.5.

4. A composition as claimed in claim 2, wherein, when weight of the phenyltrialkoxysilane and/or the oligomer thereof is referred to as "A", weight of a sum of one polyol selected from the group consisting of the acryl polyol, the polyester polyol and the polyether polyol or a combination thereof with the polyisocyanate resin is referred to as "B", weight of the organic coloring agent is referred to as "C", and weight of the coating composition is referred to as "D", the following relations hold:

B/A=0.1 to 2,

C/A=0.01 to 1 and (A+B+C)/D=0.05 to 0.5.

5. A composition as claimed in claim 3 or 4, wherein the following relations hold:

B/A=0.3 to 1.5,

C/A=0.1 to 0.3 and (A+B+C)/D=0.1 to 0.3.

* * * * *

UNITED STATES PATENT AND TRADEMARK OFFICE
CERTIFICATE OF CORRECTION

PATENT NO. : 6,262,187 B1
DATED : July 17, 2001
INVENTOR(S) : Minami et al.

Page 1 of 1

It is certified that error appears in the above-identified patent and that said Letters Patent is hereby corrected as shown below:

<u>Title page,</u>
Item "[73] Assignee: Nagase Chemtex Corporation, Osaka (JP)" should read
--[73] Assignee: Nagase Chemtex Corporation, Osaka (JP); Asahi Beer Pax Co., Ltd., Hyogo (JP) --

Signed and Sealed this

First Day of January, 2002

*Attest:*

JAMES E. ROGAN
*Attesting Officer*     *Director of the United States Patent and Trademark Office*